(No Model.)
E. W. SILSBY.
PINKING MACHINE.
No. 499,445.  Patented June 13, 1893.
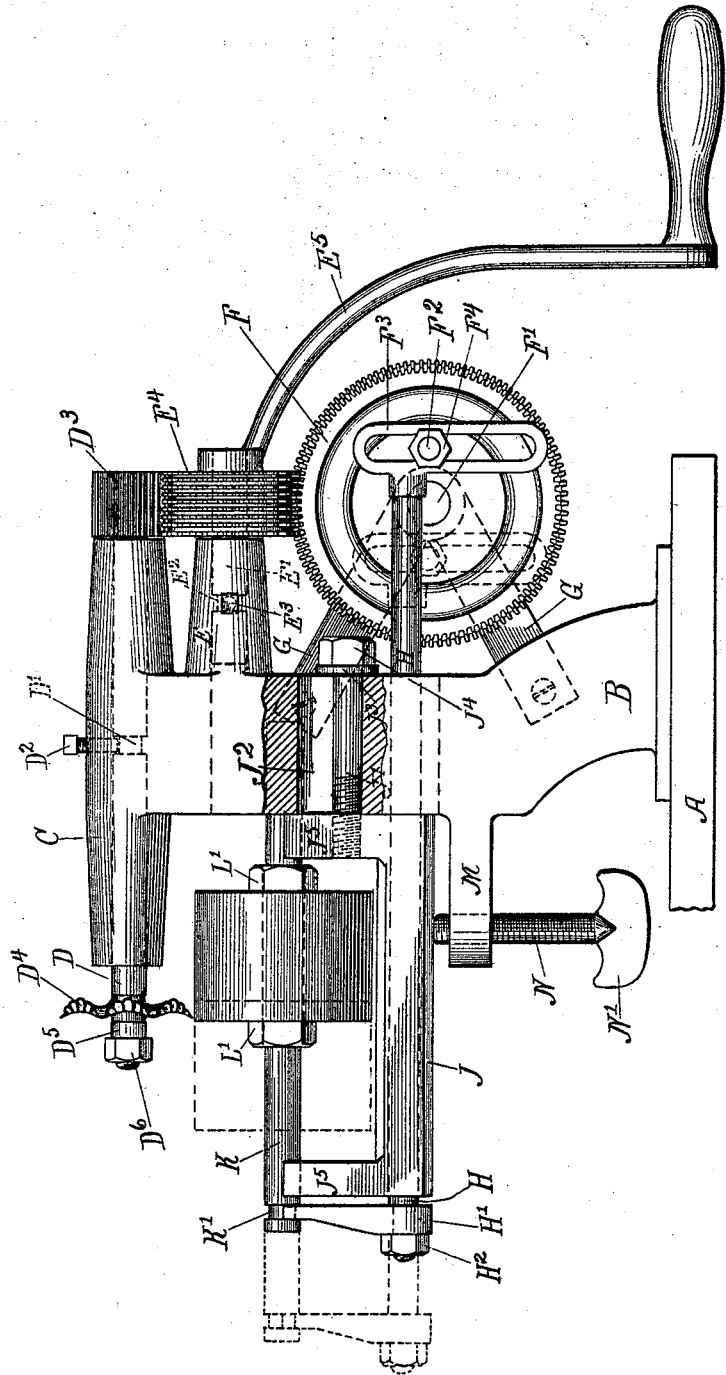
Witnesses.
E. T. Wray.
Jean Elliott.
Inventor.
Eugene W. Silsby

UNITED STATES PATENT OFFICE.

EUGENE W. SILSBY, OF CHICAGO, ILLINOIS.

PINKING-MACHINE.

SPECIFICATION forming part of Letters Patent No. 499,445, dated June 13, 1893.

Application filed August 4, 1892. Serial No. 442,205. (No model.)

*To all whom it may concern:*

Be it known that I, EUGENE W. SILSBY, a citizen of the United States, residing at Chicago, county of Cook, and State of Illinois, have invented certain new and useful Improvements in Pinking-Machines, which are fully set forth in the following specification, reference being had to the accompanying drawing, forming a part thereof.

My invention relates to pinking machines, and has for its object to provide simple, cheap and easily operated machines, and particularly such as have facilities for economically operating, adjusting and renewing the rollers against which the pinking wheel works.

My invention is illustrated in the accompanying drawing, which is a side elevation of my machine having the standard broken away at one part to show a slotted bolt-hole therein.

A is a base plate from which rises the heavy fixed standard B, at the top of which is placed the long bearing C for the pinking wheel shaft D. This shaft is grooved at $D'$, and held from longitudinal motion by the set screw $D^2$. At one end it is provided with a pinion $D^3$, and at the other end with the pinking iron or wheel $D^4$, held in position by the collar $D^5$ and the nut $D^6$. Parallel with, and somewhat below, the long bearing C, is a projecting bearing E for the driving shaft $E'$, which is grooved at $E^2$ and held from longitudinal motion by the set screw $E^3$. This shaft $E'$ carries the wheel $E^4$, whose surface is provided with longitudinal grooves, so that it acts as a gear wheel in conjunction with a pinion $D^3$. This wheel $E^4$ also has encircling grooves so that it operates as a worm gear in conjunction with the worm gear proper, F.

$E^5$ is the crank on the shaft $E'$, whereby the wheel $E^4$ is rotated and the parts are driven.

The worm gear F is supported on a bracket composed of the arms G G, which project from the standard B, said wheel F being provided with a suitable hub or shaft $F'$. Projecting from the side of this wheel is the crank pin $F^2$. This pin passes through the loop $F^3$, and is held in position by the nut $F^4$. The loop itself is attached to or rigid with the rod H, which projects through a vertical slot in the standard B, and through the roll supporter, and has, at its outer end, an upwardly projecting arm $H'$, held in position by the nut $H^2$.

J is the roll supporter, which is somewhat firmly held against the standard by means of the screw rod $J'$, which engages a screw-threaded hole in one limb of such support, and passes through a slot $J^2$ in the standard, and has, at its outer end, the washer $J^3$ and the securing nut $J^4$. The two upper limbs $J^5$ $J^5$ of the roll supporter are hollowed out so as to form bearings for the roll shaft K, one end of which is grooved at $K'$ to receive the upper end of the arm $H'$, and the other end of which is free to pass into the slot $J^2$ in the standard B.

L is the roll fixed on the shaft by means of the nuts $L'$ $L'$.

M is a projection on the standard B, through which the screw threaded rod N passes. This rod has the thumb nut $N'$ below and is adapted to bear against the under side of the roll supporter J.

These several features might be altered or varied somewhat and some of them dispensed with and other features substituted without departing from the spirit of my invention.

The use and operation of my invention are as follows:—Assuming that the apparatus is set up as indicated in the drawing, by turning the crank the pinking wheel rod and the pinking wheel will necessarily be rotated. The pinking wheel, being in contact with the roller L, will, of course, rotate it; and if the goods be interposed between the two, they will pass on through, being cut, as designed, by the action of the sharp edge of the pinking wheel against the surface of the roll. At the same time, the wheel $E^4$, serving also as a worm gear in conjunction with the worm gear F, will give the latter a slow motion of revolution, but this will cause the pin $F^2$ to slowly revolve about the center of the shaft or hub $F'$. As the loop $F^3$ encircles or encompasses this pin, it will be moved back and forth across such center, and the rod H will be given a slow motion of reciprocation as indicated by the dotted lines. This, of course, will move the arm $H'$ back and forth, and since this arm is secured to the shaft K, the latter will slide back and forth and with it the roll L. This gives the roll L a motion with reference to the pinking wheel, and hence will cause a uniform wearing of the surface of such roll. As the roll wears, its diameter is shortened, but it may be held up to the pinking iron and to its work by adjusting its support by means of the screw rod N, and also, when necessary, by loosening and sliding the rod J' upward in the slot J². By this means, the operation of the crank will drive the pinking wheel and its opposed roller to perform the work of pinking, and will, at the same time, automatically move the roller longitudinally back and forth under the pinking wheel to preserve the uniform wear of surface.

It will be apparent that the relative movement of the pinking wheel and the roller along the direction of their axes, and not merely the absolute motion of the roller, is essential to the result obtained; but I consider the construction which involves the longitudinal movement of the roller, and avoids movement of the wheel in the direction of its axis, preferable, both because it can be obtained by simpler mechanism and because it avoids changing the point at which the work is performed relatively to the eye and hand of the operator; but I do not limit myself strictly to absolute adjustment of the roller.

I claim—

1. In a pinking machine, the combination of a rotating pinking wheel with an opposed roller, and mechanism to move one with reference to the other along the line of its axis simultaneously with the rotation of the wheel.

2. In a pinking machine, the combination of a rotating pinking wheel with an opposed roller, and mechanism to simultaneously rotate the wheel and move the roller longitudinally so as to secure uniform surface wear.

3. In a pinking machine, the combination of a pinking wheel with a supporting shaft and drive wheel, an opposed roller with a supporting shaft, and a mechanism to reciprocate such roller bodily in the line of its axis simultaneously with the rotation of the wheel.

4. In a pinking machine, in combination with the frame, the pinking wheel journaled thereon, an opposing roller and a support for the same movable on the frame longitudinally with respect to the roller shaft and adapted to carry the roller with it in such longitudinal movement; a crank wheel connected to said longitudinally movable roller support to reciprocate the same on the frame, and mechanism thereon to rotate simultaneously the pinking wheel and said crank wheel: substantially as set forth.

5. In a pinking machine, in combination with the frame, the pinking wheel and the opposing roller on the frame; a crank wheel and mechanism connected therewith to shift the roller in the direction of its axis; a driving shaft on the frame and a worm thereon which meshes with and drives the crank wheel, said driving shaft being suitably geared also to the pinking wheel shaft: substantially as set forth.

6. In a pinking machine, in combination with the frame, the pinking wheel and opposing roller journaled thereon; a gear pinion upon the pinking wheel shaft; the worm gear wheel F, having a crank wrist and connections therefrom to reciprocate the roller in the direction of its axis; and the wheel E⁴ peripherally cut both as a worm and a spur gear, and adapted by virtue of the worm grooves to drive the worm gear and by virtue of the spur teeth to drive the pinking wheel: substantially as set forth.

In testimony whereof I have hereunto set my hand, in the presence of two witnesses, at Chicago, Illinois, this 1st day of August, 1892.

EUGENE W. SILSBY.

Witnesses:
JEAN ELLIOTT,
E. T. WRAY.